3,037,059
**PROCESS FOR CHLORINE ADDITION
TO ALLYL ALCOHOL**
Donald W. Kaiser, Hamden, Conn., assignor to Olin Mathieson Chemical Corporation, a corporation of Virginia
No Drawing. Filed Dec. 29, 1959, Ser. No. 862,445
2 Claims. (Cl. 260—633)

This invention relates to a new and improved process for preparing glycerol 1,2-dichlorohydrin by the addition of chlorine to allyl alcohol. The dichlorohydrin is useful for a variety of purposes, for example, being readily convertible to epichlorohydrin, employed for the manufacture of epoxy resins, or to glycerine.

The chlorination of allyl alcohol to yield glycerol 1,2-dichlorohydrin has been described, but prior methods were characterized by low yields. Thus, Huntress, "Organic Chlorine Compounds," John Wiley and Sons, New York, N.Y., 1948, p. 798, stated that chlorination of aqueous allyl alcohol gives only a 20% yield of the dichlorohydrin. According to Tornce, Ber., 24, 2670 (1891), the chlorination of dry allyl alcohol with dry chlorine also gives only a 20% yield of glycerol 1,2-dichlorohydrin. A marked improvement in yield was recorded by King and Pyman, J. Chem. Soc., 105, 1238 (1914), who chlorinated allyl alcohol in a carbon disulfide solution and obtained a 40% yield of the dichlorohydrin. Thus the addition of chlorine to allyl alcohol has generally been considered an unsatisfactory reaction for practical use. For example, Williams, American Institute of Chemical Engineers, Transactions, 37, 171 (1941) stated, "The ease of allyl alcohol production established, attention was turned next to converting it to glycerol. Direct addition of chlorine to the anhydrous alcohol to give glycerol dichlorohydrin in good yield has never been very successful with other workers and our attempts over a wide range of conditions brought no great additional hope."

It has been the main object of this invention to provide an improved process for the addition of chlorine to allyl alcohol. Further objects have included the provision of such a process whereby dichlorohydrin is readily obtained at high yields and the provision of an uncomplicated process which can be carried out quickly and economically.

The foregoing and other objects are accomplished in accordance with this invention by effecting the addition of chlorine to allyl alcohol in the presence of certain proportions of concentrated aqueous hydrochloric acid to result in yields of 50 to over 70% of glycerol 1,2-dichlorohydrin.

For best results, the addition of chlorine to the allyl alcohol is carried out in the presence of about 0.1 to 3.5 parts by weight of water per part of allyl alcohol and in the presence of sufficient HCl to form an aqueous solution containing 15 to 45% by weight of hydrogen chloride. In other words, the addition of chlorine to allyl alcohol is best carried out by providing a solution of allyl alcohol containing about 0.15 to 5 parts by weight of 15 to 45% aqueous hydrochloric acid per part by weight of allyl alcohol. The preferred solution is one containing 1 to 3 parts of 25 to 40% aqueous HCl per part by weight of allyl alcohol. The chlorination may be carried out at a temperature of about $-5°$ C. to $35°$ C., the range of $20°$ to $25°$ C. being preferred. While the addition of chlorine may be carried out in the presence or absence of light or ultra-violet radiation, the reaction is preferably effected in the absence of light.

While metallic chlorides may be used in conjunction with the hydrogen chloride, this is not the preferred practice due to resulting complications caused by limited solubility or in product isolation. The dichlorohydrin may be recovered by subjecting the reaction mixture to fractional distillation at atmospheric or reduced pressure. Preferably, the product is separated by selective extraction with a suitable solvent, for example, ethylene dichloride or other chlorinated aliphatic solvent, such as carbon tetrachloride or methylene chloride.

The following specific examples constitute illustrative embodiments in accordance with this invention. Except where otherwise stated, all parts and percentages given are by weight.

*Example 1*

A three-necked round bottomed flask was equipped with a mechanical stirrer, an adapter containing a thermometer and reflux condenser, and in the third opening a gas inlet tube. A solution of 29 parts of allyl alcohol in 118 parts of 37% aqueous hydrochloric acid was prepared and stirred. Liquid chlorine was condensed and 35.5 parts weighed into a small one-necked round bottomed flask which had previously been cooled in Dry Ice. The liquid was then allowed to vaporize from the small flask into the stirred solution through the gas inlet tube. The temperature of the solution was maintained at 20–25° C. while the reaction was carried out in the presence of diffuse sunlight. After chlorine addition, the clear colorless solution was extracted three times with 125 parts of ethylene dichloride each time. Fractionation of the combined extracts gave, after removal of the solvent, 35 parts (55.2% yield, based on allyl alcohol) of colorless glycerol 1,2-dichlorohydrin, B.P. 70–80° C./15 mm. mercury pressure.

*Example 2*

The procedure of Example 1 was repeated, using the same quantities and conditions, except that the chlorine addition was carried out in the presence of ultraviolet light. On fractionation, 38 parts of product were obtained, representing a 59% yield of dichlorohydrinn, B.P. 68–70° C./15 mm.

*Example 3*

A stirred solution of 58 parts of allyl alcohol, in 118 parts of 37% aqueous hydrochloric acid was chlorinated in apparatus described in Example 1 with 71 parts of chlorine at 20–25° C. in the presence of ultraviolet light. On fractional distillation of the reaction solution, the following fractions were obtained:

| | Parts |
|---|---|
| Cut 1: B.P. 40–70° C./200–15 mm. | 116 |
| Cut 2: B.P. 70–82° C./15 mm. | 79 |
| Cut 3: B.P. 83–115° C./15 mm. | 6 |
| Cut 4: B.P. 115–120° C./15 mm. | 5 |

The yield of glycerol 1,2-dichlorohydrin was 79 parts (61% yield).

*Example 4*

A solution of 58 parts of allyl alcohol and 11.8 parts of 37% aqueous hydrochloric acid was chlorinated, as in the above examples, in diffuse sunlight at 20–25° C. Fractionation gave the following cuts:

Cut 1: B.P. 25–70° C./15 mm___ 17 parts.
Cut 2: B.P. 73–87° C./15 mm___ 65 parts, $n_D^{25}=1.4826$.
Cut 3: B.P. 85–115° C./15 mm__ 4 parts, $n_D^{25}=1.4795$.

The yield of glycerol 1,2-dichlorohydrin was 65 parts (50.5% yield).

*Example 5*

The procedure of Example 4 was followed except that light was excluded from the chlorination flask by completely covering with aluminum foil. Fractionation of the reaction mixture gave the following cuts:

Cut 1: B.P. 30–70° C./15 mm.
   12 parts.
Cut 2: B.P. 70–85° C./15 mm.
   74 parts, $n_D^{25}=1.4827$.
Cut 3: B.P. 85–115° C./15 mm.
   5 parts, $n_D^{25}=1.4800$.
Cut 4: B.P. 115–165° C./15 mm.
   13 parts, $n_D^{25}=1.4912$.

The glycerol 1,2-dichlorohydrin product amounted to 74 parts (57.2% yield).

*Example 6*

A solution of 58 parts of allyl alcohol in 118 parts of 37% aqueous hydrochloric acid was chlorinated with 71 parts of chlorine in the absence of light at 20–25° C. The following fractions were obtained on distillation:

Cut 1: B.P. 50–80° C./150 mm.
   115 parts (two layers present).
Cut 2: B.P. 45–67° C./15 mm.
   1 part.
Cut 3: B.P. 69–80° C./15 mm.
   77.5 parts.
Cut 4: B.P. 80–115° C./15 mm.
   5 parts.
Cut 5: B.P. 115–121° C./15 mm.
   7 parts.

As some glycerol 1,2-dichlorohydrin distills with water, cut 1 was extracted with ethylene dichloride and the extract was fractionated. This yielded an additional 13 parts of product, B.P. 68–74° C./15 mm. The amount of dichlorohydrin was 90.5 parts (70.0% yield).

*Example 7*

A solution was prepared of 58 parts of allyl alcohol and 109 parts of aqueous hydrochloric acid containing 22 parts of HCl. Chlorination was carried out in the dark with 71 parts of chlorine at 20–25° C. Extraction of the solution three times with 125 parts of ethylene dichloride each time gave, on fractionation, 65 parts of dichlorohydrin, B.P. 68–80° C./15 mm. representing a 50.3% yield.

*Example 8*

A total of 142 parts of chlorine was introduced into a stirred solution consisting of 116 parts of allyl alcohol and 118 parts of 37% aqueous hydrochloric acid while the reaction mixture was maintained in the dark at 20–25° C. The solution was extracted first with 725 parts of ethylene dichloride and then with 125 parts of ethylene dichloride. The aqueous phase was mixed with 116 parts of allyl alcohol and chlorinated under the same conditions with 142 parts of chlorine. The reaction mixture was extracted three times with a total of 975 parts of ethylene dichloride. Fractionation of the combined organic extracts gave the following cuts:

Cut 1: B.P. 40–45° C./200 mm.
   Ethylene dichloride.
Cut 2: B.P. 40–68° C./200–15 mm.
   24 parts, $n_D^{25}=1.4414$.
Cut 3: B.P. 69–82° C./15 mm.
   306 parts, $n_D^{25}=1.4825$.
Cut 4: B.P. 110–125° C./15 mm.
   16 parts, $n_D^{25}=1.4795$.
Cut 5: B.P. 125–150° C./15 mm.
   18 parts, $n_D^{25}=1.4855$.
Cut 6: B.P. 150–180° C./15 mm.
   21 parts, $n_D^{25}=1.4920$.
Residue: 34 parts.

Cut 3 represented a 59.2% yield of glycerol 1,2-dichlorohydrin.

*Example 9*

While the temperature was maintained at 20–25° C., a stirred solution of 116 parts of allyl alcohol, dissolved in 295 parts of 37% aqueous hydrochloric acid, was treated with 142 parts of chlorine in the dark. The resulting solution was extracted four times with ethylene dichloride, employing a total of 775 parts. The aqueous phase was then used as a chlorination medium for another 116 parts of allyl alcohol and 142 parts of chlorine. This solution was in turn extracted with a total of 775 parts of ethylene dichloride. The aqueous phase was again recycled for the chlorination of 116 parts of allyl alcohol with 142 parts of chlorine. Extraction was carried out five times with a total of 875 parts of ethylene dichloride. The volume of the aqueous phase had increased from an initial volume of 250 ml. to 309 ml., but dilution with 500 ml. of water followed by the addition of solid sodium carbonate until the pH was 7, liberated 60 ml. of organic liquid (ethylene dichloride solution) which was combined with the previous extracts. Fractional distillation of the organic solution gave the following cuts:

Cut 1: B.P. 40–50° C./200 mm.
   Ethylene dichloride.
Cut 2: B.P. 40–70° C./15–20 mm.
   13 parts, $n_D^{25}=1.4420$.
Cut 3: B.P. 70–85° C./15–20 mm.
   537 parts, $n_D^{25}=1.4827$.
Cut 4: B.P. 86–120° C./15–20 mm.
   28 parts, $n_D^{25}=1.4769$.
Cut 5: B.P. 120–140° C./15 mm.
   8 parts, $n_D^{25}=1.4810$.
Cut 6: B.P. 150–200° C./15 mm.
   49 parts, $n_D^{25}=1.4936$.
Residue: 9 parts.

Glycerol 1,2-dichlorohydrin product amounted to 537 parts (69.3% yield).

*Example 10*

The procedure of Example 9 was followed, except that the aqueous phase was recycled four times, for a total of five runs. The volume of the aqueous phase rose from 250 ml. to 355 ml., but dilution with 500 ml. of water followed by neutralization with sodium carbonate liberated 58 ml. of ethylene dichloride solution which was added to the combined extracts. Fractionation of the extracts produced the following fractions:

Cut 1: B.P. 40–45 C./200 mm.
   Ethylene dichloride.
Cut 2: B.P. 45–68° C./200–15 mm.
   230 parts, $n_D^{25}=1.4425$.
Cut 3: B.P. 68–80° C./15 mm.
   897 parts, $n_D^{25}=1.4825$.
Cut 4: B.P. 80–115° C./15 mm.
   44 parts, $n_D^{25}=1.4792$.
Cut 5: B.P. 115–125° C./15 mm.
   23 parts, $n_D^{25}=1.4795$.
Cut 6: B.P. 125–150° C./15 mm.
   8 parts, $n_D^{25}=1.4845$.
Cut 7: B.P. 150–180° C./15 mm.
   90 parts, $n_D^{25}=1.4925$.
Residue: 30 parts.

Based on cut 3, the yield of glycerol 1,2-dichlorohydrin was 69.5%. Analysis of the product yielded the following value:

|  | Percent Cl | OH No. |
|---|---|---|
| Calculated | 55.04 | 435.5 |
| Found | 54.19 | 421.0 |

Based on chlorine analysis, the purity was 98.4% and on hydroxyl number 96.9%.

Example 11

A solution of 116 parts of allyl alcohol in 590 parts of 37% aqueous hydrochloric acid was chlorinated, with stirring, in the absence of light at 20–25° C. with 142 parts of chlorine. The solution was extracted five times with a total of 835 parts of ethylene dichloride. The aqueous phase was then employed for four more identical chlorinations. Fractionation of the combined extracts plus additional solution (131 ml.) recovered from dilution and neutralization of the aqueous phase with sodium hydroxide gave the following cuts:

Cut 1: B.P. 40–45° C./200 mm.
  Ethylene dichloride.
Cut 2: B.P. 45–70° C./200–15 mm.
  12 parts, $n_D^{25}=1.4590$.
Cut 3: B.P. 70–82° C./15–20 mm.
  928 parts, $n_D^{25}=1.4825$.
Cut 4: B.P. 82–115° C./15 mm.
  85 parts, $n_D^{25}=1.4796$.
Cut 5: B.P. 115–130° C./15 mm.
  7 parts, $n_D^{25}=1.4782$.
Cut 6: B.P. 130–150° C./15 mm.
  3 parts, $n_D^{25}=1.4856$.
Cut 7: B.P. 150–175° C./15 mm.
  44 parts, $n_D^{25}=1.4930$.
Residue: 32 parts.

928 parts of glycerol 1,2-dichlorohydrin were obtained, (71.9% yield).

Example 12

The procedure of Example 11 was followed except that the chlorination was conducted at 0–5° C. and chloroform was employed as the solvent for extraction. The yield of glycerol 1,2-dichlorohydrin B.P. 69–81° C./15 mm., $n_D^{25}=1.4826$, was 946 parts or 73.3%.

Example 13

The procedure of Example 11 was followed except that the temperature of chlorination was maintained at 30–35° C. and the extraction was carried out with carbon tetrachloride. The amount of glycerol 1,2-dichlorohydrin, B.P. 69–83° C./15–20 mm., $n_D^{25}=1.4829$, was 901 parts, representing a 69.8% yield.

Example 14

This example duplicated Example 11, except that the chlorination was carried out at 15–20° C. in the dark and propylene dichloride was employed as the organic liquid for extraction of the dichlorohydrin. Fractionation produced 908 parts (70.3% yield) of glycerol 1,2-dichlorohydrin, B.P. 71–86° C./15–20 mm., $n_D^{25}=1.4829$.

Example 15

Hydrogen chloride gas was passed into 1,180 parts of stirred 37% aqueous hydrochloric acid, cooled to −5 to 0° C. until the weight increased to 1240 g., providing a 40% hydrochloric acid solution. To this cold solution was added 232 parts of allyl alcohol. Chlorination was allowed to proceed in the dark by the vaporization of 284 parts of liquid chlorine into the stirred solution while maintaining the temperature at −5 to 0° C. After the addition, the solution was extracted five times with a total of 1,336 parts of methylene dichloride. The aqueous portion was diluted with 750 parts of water and slowly neutralized by the gradual addition of a 40% sodium hydroxide solution. An additional 74 ml. of organic liquid was then separated and combined with the methylene dichloride extracts. Fractionation of the extracts produced the following cuts:

Cut 1: B.P. 39–41° C.
  Methylene dichloride.
Cut 2: B.P. 41–71° C./760–15 mm.
  11 parts, $n_D^{25}=1.4589$.
Cut 3: B.P. 71–83° C./15 mm.
  385 parts, $n_D^{25}=1.4825$.
Cut 4: B.P. 83–114° C./15 mm.
  23 parts, $n_D^{25}=1.4794$.
Cut 5: B.P. 114–131° C./15 mm.
  22 parts, $n_D^{25}=1.4783$.
Cut 6: B.P. 132–151° C./15 mm.
  6 parts, $n_D^{25}=1.4857$.
Residue: 17 parts.

The 385 parts of glycerol 1,2-dichlorohydrin represented a 74.6% yield. Analysis gave the following values:

|  | Percent Cl | OH No. |
|---|---|---|
| Calculated | 55.04 | 435.5 |
| Found | 54.20 | 428.0 |

While a slight excess of either allyl alcohol or chlorine, up to about 10%, may be employed in the process of this invention, the use of substantially equimolar proportions is preferred as providing the best results. The exothermic reaction yielding the 1,2-dichlorohydrin is very rapid, and generally the rate of chlorine addition is so chosen that the temperature of the reaction mixture does not exceed the desired value. The total reaction time may be reduced to ten to thirty minutes or less by the provision of adequate cooling of the reaction mixture. Also, the process may be carried out in continuous manner, if desired.

As modifications of the illustrative details will be apparent to those skilled in the art, the invention is to be considered as limited only by the features set forth in the following claims.

What is claimed is:

1. In the preparation of glycerol dichlorohydrin, the process comprising reacting substantially equimolar proportions of allyl alcohol and chlorine at a temperature of about −5° C. to 35° C. in the presence of 0.15 to 5 parts of a solution consisting essentially of about 15% to 45% by weight aqueous hydrochloric acid per part by weight of allyl alcohol.

2. In the preparation of glycerol dichlorohydrin, the process comprising reacting substantially equimolar quantities of allyl alcohol and chlorine at a temperature of about 20° C. to 25° C. in the presence of substantially 1 to 3 parts of a solution consisting essentially of about 25% to 40% by weight aqueous hydrochloric acid per part by weight of allyl alcohol.

References Cited in the file of this patent

De la Mare et al.: J. Chem. Soc. (London), 1954, pages 3990–5.